United States Patent
Ozkan et al.

(10) Patent No.: US 11,212,171 B1
(45) Date of Patent: Dec. 28, 2021

(54) CUSTOMER SELF-SERVICE CLOUD APPLICATION PROVISIONING

(71) Applicant: Oracle International Corporation, Redwood Shores, CA (US)

(72) Inventors: Lisa Ozlem Ozkan, Danville, CA (US); Weiran Zhao, Foster City, CA (US); Srikanth Chittineni, Pleasanton, CA (US); Lawrence Yoo Lindsey, Pleasanton, CA (US); Kanchan Shringi, FosterCity, CA (US); Ajay Kumar Singh, Fister City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/147,307

(22) Filed: Jan. 12, 2021

Related U.S. Application Data

(60) Provisional application No. 63/046,548, filed on Jun. 30, 2020.

(51) Int. Cl.
*H04L 12/24* (2006.01)
*H04L 29/08* (2006.01)
*G06F 9/50* (2006.01)

(52) U.S. Cl.
CPC ........ *H04L 41/0806* (2013.01); *G06F 9/5072* (2013.01); *H04L 41/12* (2013.01); *H04L 41/5051* (2013.01); *H04L 67/1002* (2013.01)

(58) Field of Classification Search
CPC . H04L 41/0806; H04L 41/12; H04L 41/5051; H04L 67/1002; H04L 67/1029; H04L 67/34; H04L 63/0428; H04L 65/1059; G06F 16/254; G06F 9/5016; G06F 9/5072; G06F 9/5077; G06F 9/541; G06F 9/54; H04N 21/2547
See application file for complete search history.

(56) References Cited

U.S. PATENT DOCUMENTS

| | | | |
|---|---|---|---|
| 6,778,525 B1 | 8/2004 | Baum et al. | |
| 8,959,229 B1 | 2/2015 | Grasselt et al. | |
| 9,250,887 B2 | 2/2016 | Lucovsky et al. | |
| 9,250,974 B1 | 2/2016 | Estes et al. | |
| 9,329,951 B2 | 5/2016 | Jaisinghani | |
| 9,426,030 B1 | 8/2016 | Anerousis et al. | |
| 9,832,205 B2 | 11/2017 | Santhi et al. | |
| 10,225,140 B2 | 3/2019 | Subramani et al. | |
| 10,270,885 B2 | 4/2019 | Owen et al. | |
| 10,382,291 B2 | 8/2019 | Subramani et al. | |
| 10,904,395 B1 * | 1/2021 | Liu | H04L 65/1059 |
| 2006/0245354 A1 | 11/2006 | Gao et al. | |
| 2011/0265164 A1 | 10/2011 | Lucovsky et al. | |
| 2011/0265168 A1 | 10/2011 | Lucovsky et al. | |

(Continued)

*Primary Examiner* — Le H Luu
(74) *Attorney, Agent, or Firm* — Invoke

(57) ABSTRACT

Techniques for self-service provisioning and activation of cloud services are disclosed. In some embodiments, a self-service user interface is generated through which a cloud service subscriber may input configuration parameters to customize an instance of the cloud service. The configuration parameters may define topology, deployment, and/or operational configurations for the cloud service. Responsive to receiving configuration parameters through the self-service user interface, a set of instructions may be automatically generated and executed to perform one or more provisioning operations.

20 Claims, 16 Drawing Sheets

(56) References Cited

U.S. PATENT DOCUMENTS

| | | |
|---|---|---|
| 2012/0060165 A1 | 3/2012 | Clarke |
| 2013/0031559 A1 | 1/2013 | Alicherry |
| 2013/0185431 A1 | 7/2013 | Venkatesh et al. |
| 2013/0232463 A1 | 9/2013 | Nagaraja et al. |
| 2013/0232480 A1 | 9/2013 | Winterfeldt et al. |
| 2013/0232497 A1 | 9/2013 | Jalagam et al. |
| 2013/0232498 A1 | 9/2013 | Mangtani et al. |
| 2013/0263209 A1 | 10/2013 | Panuganty |
| 2014/0040343 A1* | 2/2014 | Nickolov ............ H04L 67/1029 709/201 |
| 2014/0052867 A1 | 2/2014 | Lucovsky et al. |
| 2014/0074647 A1 | 3/2014 | Mukherjee et al. |
| 2015/0058459 A1 | 2/2015 | Amendjian et al. |
| 2015/0067171 A1 | 3/2015 | Yum et al. |
| 2015/0154293 A1 | 6/2015 | Lu |
| 2015/0378703 A1 | 12/2015 | Govindaraju et al. |
| 2016/0043970 A1 | 2/2016 | Jacob et al. |
| 2016/0065417 A1 | 3/2016 | Sapuram et al. |
| 2016/0094483 A1 | 3/2016 | Johnston et al. |
| 2016/0337175 A1 | 11/2016 | Rao |
| 2016/0381151 A1 | 12/2016 | Apte et al. |
| 2017/0134301 A1 | 5/2017 | Chen et al. |
| 2017/0134519 A1 | 5/2017 | Chen et al. |
| 2017/0139695 A1 | 5/2017 | Govindaraju et al. |
| 2017/0207968 A1 | 7/2017 | Eicken et al. |
| 2017/0243263 A1 | 8/2017 | Vedala |
| 2017/0244593 A1 | 8/2017 | Rangasamy et al. |
| 2017/0302537 A1 | 10/2017 | Maes |
| 2017/0324813 A1* | 11/2017 | Jain ........................ G06F 9/5016 |
| 2018/0316551 A1 | 11/2018 | Subramani et al. |
| 2018/0316552 A1 | 11/2018 | Subramani et al. |
| 2019/0044806 A1 | 2/2019 | Sedayao |
| 2019/0327294 A1 | 10/2019 | Subramani et al. |
| 2019/0394087 A1 | 12/2019 | Nadella et al. |
| 2020/0186416 A1 | 6/2020 | Hashimoto et al. |
| 2020/0314171 A1* | 10/2020 | Featonby .............. G06F 9/5077 |
| 2020/0329464 A1* | 10/2020 | Madapoosi Sampath ................... G06F 9/5072 |
| 2020/0334269 A1* | 10/2020 | Chowdhury .......... G06F 16/254 |
| 2020/0351345 A1* | 11/2020 | Bansod .................. H04L 67/34 |
| 2020/0374106 A1* | 11/2020 | Padmanabhan ..... H04L 63/0428 |
| 2021/0026661 A1* | 1/2021 | Sulcer ................. H04L 41/5051 |
| 2021/0034581 A1* | 2/2021 | Boven ..................... G06F 9/541 |
| 2021/0067820 A1* | 3/2021 | Shivapurkar ...... H04N 21/2547 |
| 2021/0089368 A1* | 3/2021 | Goosen ..................... G06F 9/54 |

* cited by examiner

FIG. 5H

≡ ORACLE® Cloud Services [urbanbeans] ? Contact ⊙ Chat ⊙ 🖶 🔒 (DL)

Configure Apps

Create Production Instance [Save]

Manage Production Instances

Production Instance 1 ✕
Test Instance 1
| Production Instance 2 | ✕
Test Instance 2

Production Instance 2

Configuration Options

Name ⓘ    Additional Language Pack ⓘ   Identity Domain ⓘ
edsfg     Spanish ▽     urbanbeans Data Center ⓘ   Version ⓘ
▽ Chicago    R13

Service Entitlements

Service                           Entitlements

B85800 - Oracle Human Capital Management Base    10000
Cloud Service - Hosted Employee

Services Purchased

Oracle ERP Cloud Service

B86836 Oracle Fusion Financials
Cloud Service - Hosted Employee
Entitlements    Add to Selected
0            Instance B86846 Oracle Fusion Sourcing
Cloud Service - Hosted Employee
Entitlements    Add to Selected
0            Instance

Oracle HCM Cloud Service

B85800 - Oracle Human Capital
Management Base Cloud Service
- Hosted Employee
Entitlements    Add to Selected
0            Instance

Test Environments

B84490 - Oracle Additional Test
Environment for Oracle Fusion
Cloud Service - Each Add New Test Instance Which Production instance do you want
to associate this test instance with?
Production Instance 1
Production Instance 2

FIG. 5I

≡ ORACLE® Cloud Services | urbanbeans | ⊙ ☺ ♀ ? DL

Configure Apps | Create Production Instance | Save

Services Purchased

Oracle ERP Cloud Service

B86836 Oracle Fusion Financials Cloud Service - Hosted Employee
Entitlements    Add to Selected
0    Instance B86846 Oracle Fusion Sourcing Cloud Service - Hosted Employee
Entitlements    Add to Selected
0    Instance Oracle HCM Cloud Service B85800 - Oracle Human Capital Management Base Cloud Service - Hosted Employee
Entitlements    Add to Selected
10000    Instance

Test Environments

B84490 - Oracle Additional Test Environment for Oracle Fusion Cloud Service - Each Add New Test Instance

---

Manage Production Instances

Production Instance 1
   Test Instance 1 ✕
   [Test Instance 1A] ✕

Production Instance 2
   Test Instance 2

Test Instance 1A

Configuration Options

Name ⓘ    Additional Language Pack ⓘ    Identity Domain ⓘ
edsfc- dev1    Spanish ▽    urbanbeans Data Center ⓘ    Version ⓘ
▽ Chicago    R13

Associated Production Instance
Production Instance 1

528

≡ ORACLE® Cloud Services | urbanbeans | ✎ Contact | ✎ Chat | ⊙ ⌂ ? | DL

Configure Apps

Create Production Instance | Save | Close

⚠ Fusion Manufacturing Cloud is not supported on your existing Fusion R12 environment.
Please select one of the options belows to initiate your instance creation.

Request to upgrade your current instance to R13

Delete existing instance and recreate a new Fusion instance with all services on R13 version Create a separate Fusion instance by clicking on "Create Production Instance" and add your Fusion Manufacturing Cloud entitlements to the R13 instance.

| Test Instance 1 | | |
|---|---|---|
| Name<br>edbc | Additional Language Pack<br>Spanish ▽ | Identity Domain<br>urbanbeans |
| Data Center<br>Chicago ▽ | Version<br>R12 ▽ | |

| Service Entitlements | |
|---|---|
| Service | Entitlements |
| B86836 Oracle Fusion Financials Cloud Service – Hosted Employee | 10000 |
| B86846 Oracle Fusion Sourcing Cloud Service – Hosted Employee | 1000 |

Entitlements | Add to Selected
100 | instance.

FIG. 5K

CUSTOMER SELF-SERVICE CLOUD APPLICATION PROVISIONING

RELATED APPLICATIONS; INCORPORATION BY REFERENCE

This application is related to Provisional Appl. No. 63/046,548, filed Jun. 30, 2020, the entire contents of which are incorporated herein by reference.

This application is further related to U.S. application Ser. No. 15/498,184, titled "PORTABLE INSTANCE PROVISIONING FRAMEWORK FOR CLOUD SERVICES"; and U.S. application Ser. No. 15/498,294, titled "PROVISIONING FRAMEWORK FOR BINDING RELATED CLOUD SERVICES"; the entire contents for each of which are incorporated herein by reference.

TECHNICAL FIELD

The present disclosure relates to cloud computing environments. In particular, the present disclosure relates to performing provisioning operations for instances of a cloud service.

BACKGROUND

Cloud computing involves the use of hardware and software resources to provide services over a network. In many cloud computing models, a cloud service provider is responsible for providing and maintaining the hardware and software infrastructure used to run instances of the cloud service. By shifting these responsibilities to the cloud service provider, entities that subscribe to the cloud service may quickly deploy complex systems and applications without incurring the upfront costs of acquiring and setting up the supporting hardware and software. Another benefit of cloud computing is that computing resources may be shared by multiple tenants, which improves scalability and spreads the costs of the underlying infrastructure over multiple parties.

Cloud provisioning refers to the allocation of cloud computing resources to tenants. Cloud service providers may perform provisioning operations to allocate resources for new tenants of a cloud service, reallocate resources for current tenants, and/or deallocate resources for previous tenants. Cloud provisioning operations are typically performed by cloud administrators through manual resource configuration and/or custom-built programs such as configuration scripts.

Cloud provisioning can be a cumbersome and error-prone process for cloud administrators. In some cases, cloud administrators have incomplete or inaccurate information to correctly configure an instance of a cloud service. Such information may be inaccurately communicated or unknown by the person ordering the cloud service on behalf of an enterprise. Improperly executed provisioning operations may require significant rework causing fulfillment delays and inefficient resource utilization. Provisioning errors may also be costly and difficult to correct.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 5A-5K illustrate an example set of user interfaces through which subscribing entities may perform self-service activation and provisioning operations in accordance with some embodiments.

DETAILED DESCRIPTION

Figure 1:
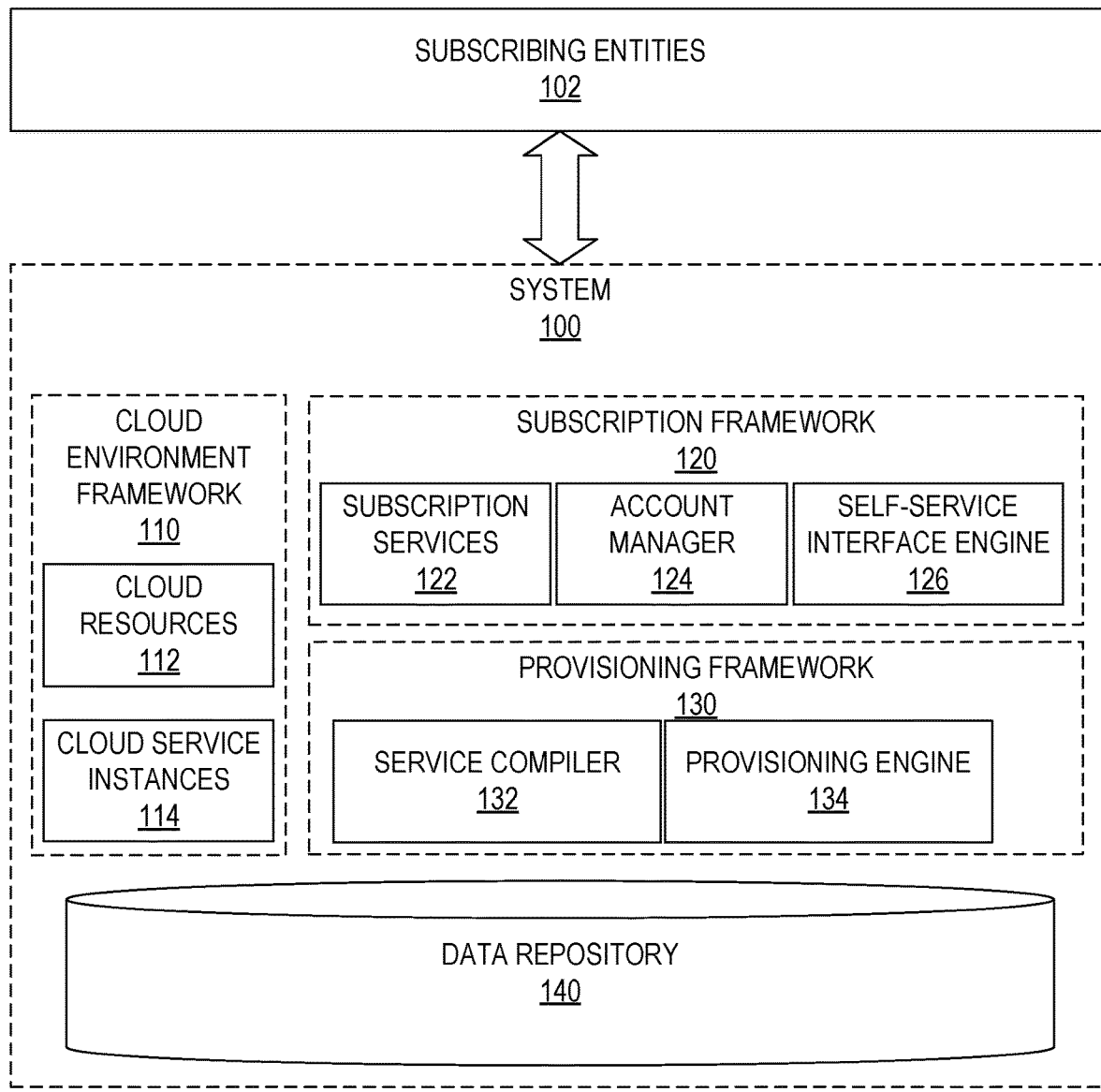
FIG. 1 illustrates a system for self-service provisioning of cloud service instances in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. SELF-SERVICE CLOUD SERVICE ACTIVATION AND PROVISIONING
   3.1 PROMPTING SUBSCRIBERS FOR CONFIGURATION PARAMATERS
   3.2 SELF-SERVICE CUSTOMIZATION OF TOPOLOGY PARAMETERS
   3.3 SELF-SERVICE CONFIGURATION OF IDENTITY DOMAIN PARAMETERS AND ENTITLEMENT ALLOCATIONS
   3.4 RESTRICTING AVAILABLE CONFIGURATION OPTIONS
   3.5 AUTOMATICALLY PROVISIONING RESOURCES BASED ON SUBSCRIBER INPUT
4. ADJUSTABLE SUBSCRIPTION PERIODS
5. EXAMPLE SELF-SERVICE CONFIGURATION INTERFACES
6. COMPUTER NETWORKS AND CLOUD NETWORKS
7. HARDWARE OVERVIEW
8. MISCELLANEOUS; EXTENSIONS

1. General Overview

Techniques herein provide for accelerated cloud service activation through self-service provisioning. In some embodiments, entities that subscribe to a cloud service initiate activation and provisioning of the cloud service on their own. The self-service provisioning techniques provide more control to cloud service subscribers, which may help reduce provisioning errors and improve the user experience.

For example, subscribers may control or influence various configuration parameters associated with provisioning such as what datacenter to use to provision resources, whether cloud services are provisioned in the same or separate environments, and/or how many users there are in each environment for the subscription.

In some embodiments, a self-service provisioning system generates and presents a user interface (UI) to entities that have acquired a subscription to a cloud service. The self-service provisioning UI may guide and facilitate entry of various configuration parameters to provision an instance of the cloud service for the entity. For example, the self-service provisioning UI may include input fields, drop-down lists, radio buttons, and/or other UI elements through which a subscribing entity may submit configuration parameters. The configuration parameters that are available for selection may depend on various factors such as what cloud service is being subscribed to, whether the subscribing entity is subscribed to any other cloud services, whether the subscribing entity is new to or has an existing subscription for the current cloud service, where the subscribing entity is primarily located, and/or other attributes associated with the subscribing entity.

In some embodiments, a self-service provisioning process allows subscribing entities to create and configure services at their own pace. Subscribing entities do not need to provide all relevant configuration parameters at the time of subscribing to a cloud service. The configuration parameters may instead be submitted through the self-service provisioning UI at a future time after an order has been placed. Thus, a person ordering a cloud service on behalf of an enterprise or other entity does not need to know all relevant configuration parameters. Another representative of the subscribing entity, such as an information technology (IT) specialist, may instead be responsible for submitting the configuration parameters through the self-service UI at a time that is convenient to them. The self-service provisioning system may provide a flexible timeframe for submitting the configuration parameters to facilitate delegation of duties among different associates of the subscribing entity.

In some embodiments, the subscribing entity is given a window of time for submitting the configuration parameters. If the configuration parameters are submitted within the window of time, then the self-service system may provision an instance of the cloud service and initiate an associated subscription period. If the configuration parameters have not been received within the window of time, then one or more responsive actions may be triggered. As an example, the subscription period may be initiated prior to provisioning if the subscriber has not canceled within the window of time. As another example, the subscription may be automatically terminated. In yet another example, a reminder notification may be sent to a subscriber, and the window of time may be extended.

In some embodiments, the self-service provisioning system automatically provisions computing resources for an instance of the cloud service based in part on the configuration parameters submitted by the subscribing entity. Responsive to receiving the configuration parameters, the self-service provisioning system may generate and execute a set of configuration instructions, such as configuration scripts and/or other configuration files, as a function of the parameters submitted by the subscribing entity. For example, the configuration instructions, when executed, may provision resources from a particular datacenter location selected by the subscribing entity, in a same or different environment as another instance of a cloud service owned by the subscribing entity, and/or to support a particular number of users within a given environment as specified by the subscribing entity. After the configuration parameters have been submitted, the provisioning process may be fully automated so that little or no human involvement is required on the part of the cloud service provider.

One or more embodiments described in this Specification and/or recited in the claims may not be included in this General Overview section.

2. Architectural Overview

In some embodiments, a self-service provisioning framework allows a subscribing entity to direct, influence, and/or otherwise control how resources are provisioned for an instance of a cloud service. A subscribing entity may be an enterprise, group, individual, application, service, or any other entity that is subscribed to or in the process of subscribing to a cloud service. A cloud service may include a software-as-a-service (SaaS), a database-as-a-service (DBaaS), a platform-as-a-service (PaaS), an infrastructure as a service (IaaS), or any other type of service accessible over a network.

In some embodiments, the cloud environment comprises a multi-tenant architecture where tenants share hardware resources and/or software resources. For example, a multi-tenant instance of an PaaS may allow a significant number of tenants to develop and manage applications in the cloud while sharing the same cloud infrastructure. As another example, a multi-tenant DBaaS may allow multiple tenants to share an instance of a database application, a database schema, a database server, and/or other database resources. Similarly, an SaaS application may support multiple tenants using a shared software application, application server, and/or other application resources.

In some cases, a multi-tenant architecture may provide shared resources at one layer but not at another layer. For example, a cloud service platform may provide a multi-tenant PaaS, but only a single tenant DBaaS. As another example, the cloud service platform may provide a multi-tenant DBaaS, but only a single tenant SaaS. Thus, the multi-tenant architecture of the cloud service platform may vary depending on the particular implementation.

A tenant may comprise a single user or a group of users of an instance of the cloud service. A "user" in this context may be a human user or a separate application or service. For example, a tenant may correspond to an enterprise or a department within an enterprise that subscribes to a cloud service on behalf of a group of users that are employed or otherwise associated with an enterprise. As another example, a tenant or user of a cloud service, such as a DBaaS, may be an application that accesses the cloud service to extend the application's functionality.

Tenants may access one or more cloud services using a set of authentication credentials. The cloud service platform may attach different permissions to different authentication credentials to preserve tenant anonymity within the cloud. As an example, an identity and access management (IAM) policy or identity domain may define what actions are allowed by a tenant, what resources the tenant is allowed to access, and the effects of a tenant's request to access a resource. If the tenant attempts to perform an unauthorized action and/or attempts to access an unauthorized resource, the request is denied. The policies may be defined to prevent a tenant from knowing what other tenants are accessing cloud targets within the multi-tenant cloud platform.

In some embodiments, a subscribing entity corresponds to one or more tenants. A subscribing entity may have multiple subscriptions to one or more cloud services offered by a given cloud service provider. When an entity subscribes to multiple services, the services may be managed in separate environments or merged into a single cloud environment.

FIG. 1 illustrates a system for self-service provisioning of cloud service instances in accordance with some embodiments. System 100 generally comprises cloud environment framework 110, subscription framework 120, provisioning framework 130, and data repository 140. In some embodiments, these components are owned, operated, and/or otherwise managed by one or more cloud service providers. Subscribing entities 102 may access components of system 100 or some subset thereof in accordance with the techniques described further herein. Components of system 100 may be implemented in software and/or hardware. Each component may be distributed over multiple applications and/or machines. Multiple components may be combined into one application and/or machine. Operations described with respect to one component may instead be performed by another component.

Cloud environment framework 110 corresponds to one or more cloud environments. A cloud environment may comprise one or more of cloud resources 112 and one or more of cloud service instances 114. Cloud resources 112 represent cloud computing infrastructure that may be provisioned to provide cloud services to one or more tenants. Cloud resources 112 may include hardware, software, and/or other computing resources that may be accessed over a network. Cloud resources 112 may be deployed within one or more datacenters and/or other network environments that are managed, owned, and/or otherwise controlled by a cloud service provider.

Cloud service instances 114 represent instances of a PaaS, SaaS, DBaaS, and/or other cloud services that are provided using hardware and software provisioned from cloud resources 112. When one of subscribing entities 102 subscribes to a cloud service, hardware and/or software resources are provisioned from cloud resources 112 to support an instance of the cloud service. One or more users associated with the subscribing entity may be granted access to the provisioned resources or some subset thereof, such as through the use of authentication credentials and IAM policies. Subscribing entities 102 may be restricted from accessing any cloud resources 112 that have not been provisioned for instances of a cloud service to which the entity is subscribed. For example, a subscribing entity may be prevented from accessing servers, storage appliances, database instances, software applications, and/or other computing resources within a cloud environment that have been provisioned for other tenants or that have not been provisioned for any cloud service instance.

Subscription framework 120 provides logic that allows subscribing entities 102 to control various aspects of cloud service subscriptions, including activation and provisioning. The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

In some embodiments, subscription framework 120 provides frontend, subscriber-facing interfaces and components for subscribing entities 102 to initiate and manage cloud service subscriptions. For example, subscription framework 120 may provide components that allow subscribing entities to initiate and execute self-service activation and provisioning processes as described further herein. Subscription framework 120 may include subscription services 122, account manager 124, and self-service interface engine 126. Subscription framework 120 may be executed by one or more servers. Subscribing entities 102 may access and invoke one or more components of subscription framework through client applications, such as web browsers or mobile apps. The client applications may send and receive messages using one or more communication protocols of the Internet Protocol (IP) suite, such as messages conforming to the Hypertext Transfer Protocol (HTTP).

In some embodiments, subscriptions services 122 includes logic for processing requests to subscribe to a cloud service, initiating new subscriptions, terminating subscriptions, renewing subscriptions, and monitoring subscription periods. Subscribing entities 102 may submit subscription requests through client applications. For example, a subscribing entity may submit a request to subscribe to a service via a webpage or mobile app interface. In response, subscription services 122 may initiate a new activation and provisioning job for a new or existing cloud service subscription, depending on whether the subscribing entity is an existing or new subscriber.

Account manager 124 includes logic for managing cloud service accounts for subscribing entities. For example, account manager 124 may manage and validate authentication credentials, establish and enforce IAM policies, and/or present information about subscribed-to cloud service instances. In some embodiments, a cloud service account is provisioned for a subscribing entity before a subscribed-to cloud service instance has been provisioned. The subscribing entity may subsequently initiate self-service configuration as described further herein to provision an instance of the cloud service within a flexible timeframe.

Self-service interface engine 126 includes logic for generating and presenting self-service UIs through which subscribing entities may select and/or otherwise input configuration parameters. In some embodiments, self-service interface engine 126 generates an interactive graphical user interface (GUI) for each new subscription. The GUI may be rendered in a subscribing entity's client application, such as a web browser or mobile app. The subscribing entity may then be guided to input configuration parameters for the instance of the cloud service through a series of user interface elements. Examples of user interface elements include checkboxes, radio buttons, dropdown lists, list boxes, buttons, toggles, text fields, date and time selectors, command lines, sliders, pages, and forms.

Provisioning framework 130 comprises components for automatically generating and executing instructions to perform provisioning operations based on a set of input configuration parameters. Provisioning framework 130 may include service compiler 132 and provisioning engine 134.

In some embodiments, service compiler 132 comprises logic to generate instructions for cloud service instances.

When a user submits a set of configuration parameters for a new instance of a cloud service, service compiler may map or translate the requested configuration to a set of one or more instructions. Example instructions include configuration scripts, such as config-lists, and/or other configuration files, which may be generated as a function of the input configuration parameters. The configuration files may define CRUD (Create, Read, Update, Delete) operations or any other type of configuration type instructions for allocating, deallocating, and/or otherwise modifying a configuration of cloud resources 112.

Provisioning engine 134 may execute the instructions to perform provisioning operations for an instance of a cloud service. Example provisioning operations may include: (a) creating new instances of a cloud service; (b) updating current instances of a cloud service, including scaling up (i.e., allocating additional resources), scaling down (i.e., deallocating resources), and upgrading/modifying currently allocated resources; and (c) deleting/decommissioning instances of a cloud service.

In some embodiments, provisioning engine 134 generates run lists during provisioning operations. A run list in this context is a data object that captures runtime information about the progress of a provisioning operation. For example, a run list may map a sequence of sub-operations in a provisioning flow to a set of corresponding status indicators. Status indicators may track whether the corresponding sub-operation completed successfully, failed, is currently pending, or has not been started. If a sub-operation fails, provisioning engine 134 may retry the operation and/or generate an alarm to notify a user, such as a cloud administrator.

Data repository 140 stores data for one or more components of system 100. Example data that may be stored may include, but is not limited to, configuration files, self-service interface objects, engine metadata, and run lists. These datasets may be read and/or written by one or more components of system 100 to perform various provisioning operations as described further herein.

In some embodiments, data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, data repository 140 may be implemented or may execute on the same computing system as one or more other components of system 100. Alternatively or additionally, data repository 140 may be implemented or executed on a computing system separate from other components of system 100. Data repository 140 may be communicatively coupled to other components via a direct connection or via a network.

3. Self-Service Cloud Service Activation and Provisioning 3.1 Prompting Subscribers for Configuration Parameters In some embodiments, system 100 initiates a self-service activation and/or provisioning process when a subscribing entity has submitted an order or subscription request for a cloud service. During the activation and provisioning process, a subscribing entity may be prompted or otherwise guided to input a set of configuration parameters for a new instance of the cloud service. The configuration parameters may control various aspects of the deployment, topology, and/or operational configurations of a cloud service. The configuration parameters that are captured via the self-service framework may vary from one cloud service to the next, depending on the particular implementation.

Figure 2:
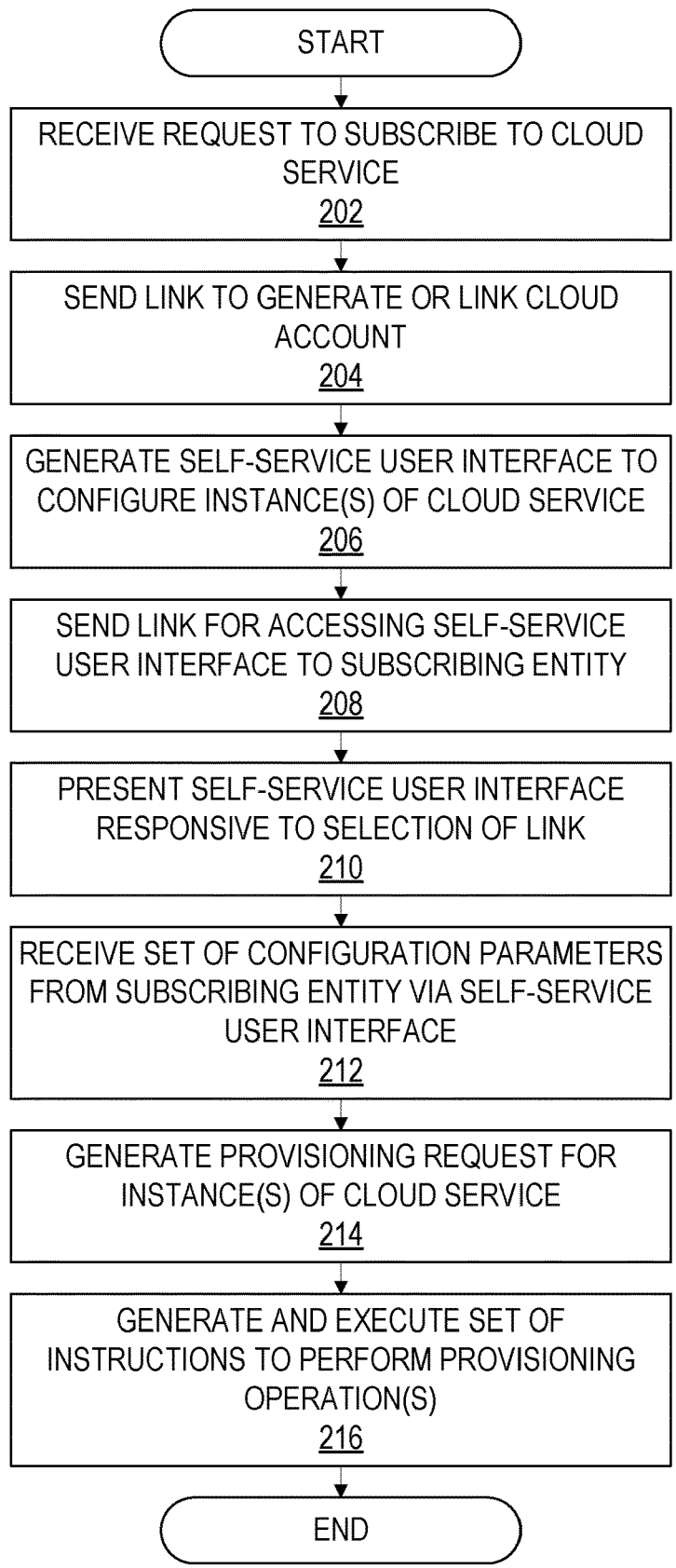
FIG. 2 illustrates an example set of operations for activating and provisioning instances of a cloud service in accordance with some embodiments.

FIG. 2 illustrates an example set of operations for activating and provisioning instances of a cloud service in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, system 100 receives a request to subscribe to a cloud service (operation 202). In some embodiments, the request captures entitlements, identification information, and/or payment information for a subscribing entity. Example entitlement information that may be captured for a cloud service may include the type of cloud service being ordered, a tier or quality of service (QoS) for the cloud service, and/or the number of users accessing the service. Example identification information may include an entity name, email, address, and/or phone number for the subscribing entity. Deployment, topology, and operational details for the cloud service instance are not required at this stage. Thus, a subscribing entity may submit an order for a cloud service even though the person submitting the order is not aware of and does not specify the configuration parameters for properly provisioning an instance of the cloud service.

Responsive to the request, subscription services 122 prompts the subscribing entity to create a new cloud account or link an existing cloud account (operation 204). In some embodiments, subscription services 122 sends a cloud account activation message, such as an email or short message service (SMS), that includes a link to activate a cloud account. An example link is a uniform resource locator (URL) referencing the location of a web page (or series of web pages) or application page (or series of application pages) through which the subscribing entity may be guided through the process of creating a new cloud account or linking an existing account. The activation process may involves establishing new authentication credentials for a new account or authenticating the user using existing credentials for already existing cloud accounts. By sending an activation email, the subscribing entity may determine whether a new account should be created and/or which account to link after an order for a cloud service has been placed, which allows flexibility and facilitates delegation of responsibilities by the subscribing entity. In other embodiments, the cloud accounts may be created or linked as part of the order process before the order is booked. Subscription services 122 may maintain a mapping between a cloud account identifier and one or more order identifiers for cloud services linked to the cloud account.

Referring to FIG. 2, once a cloud account has been created or linked, self-service interface engine 126 generates a self-service UI to configure instance(s) of the cloud service (operation 206). In some embodiments, the self-service UI is accessible via the cloud account belonging to the subscribing entity, which may be newly created during the self-service activation and provisioning process or a preexisting account associated with other cloud services subscribed to by the subscribing entity.

Subscription services 122 further sends a link for accessing the self-service UI to the subscribing entity (operation 208). In some embodiments, subscriptions services 122 sends a service activation message that includes the link. The service activation message may be sent by email, SMS, a message posted to the linked cloud account, and/or through one or more other communication channels. As with the cloud account activation message, the link may be a URL referencing the location of a web page or application page. The web page or application pages may embody a self-service UI for activating the cloud service and defining the cloud service configuration parameters.

When a user associated with the subscribing entity selects the link, system 100 presents the self-service UI to the user (operation 210). For example, the self-service UI may include a webpage (or series of webpages) that is rendered in a client browser responsive to the user clicking on or otherwise selecting the URL. As another example, the self-service UI may be an application page (or series of pages) within another client application, such as a mobile app. The rendered self-service UI may include a set of UI elements, such as buttons and drop-down menus, through which a user may select configuration options. Example user interfaces are provided in Section 5 below.

System 100 next receives a set of configuration parameters from the user representing the subscribing entity (operation 212). The user inputting the configuration parameters may be the same or a different user than the one that submitted the order for the cloud service. Example configuration parameters may include topology and/or entitlement allocation information as discussed further below.

Once the user has submitted the configuration parameters, subscription framework 120 generates a provisioning request or job for an instance of the cloud service (operation 214). The provisioning job may be placed in a work or messaging queue for subsequent processing by provisioning framework 130.

Responsive to the provisioning request, provisioning framework 130 generates and executes a set of instructions to perform one or more provisioning operations for the instance of the cloud service (operation 216). For example service compiler 132 may generate a set of instructions for performing one or more provisioning operations as a function of the configuration parameters. Provisioning engine 134 may then execute the instructions.

3.2 Self-Service Customization of Topology Parameters

As previously mentioned, the user may be prompted to input configuration parameters, which may include requested topology configurations for the instance of the cloud service. A topology configuration may define how computing resources are physically or logically arranged. A user may be presented with a set of topology configuration options via the self-service UI.

In some embodiments, physical topology configuration options allow a subscribing entity to specify one or more physical locations from which to provision computing resources for an instance of the cloud service. For example, the cloud service provider may manage computing resources physically located in datacenters dispersed over different states, provinces, countries, or other regions. The user may view, navigate, and select one or more physical location options available through the cloud service provider. Computing resources may then be provisioned from the selected physical location(s) to support an instance of the cloud service subscribed to by the user.

In some embodiments, physical and/or logical topology configuration options allow a subscribing entity to control or influence how data flows within a cloud computing environment. For example, a subscribing entity may select a particular network topology. Examples include a ring, mesh network, or star network, to use within a cloud computing environment. The select topology configuration may control how data flows into and/or out of the cloud service instance. Additionally or alternatively, the topology configuration may define how data flows from one component to another within a cloud environment.

In some embodiments, the subscribing entity is prompted to define logical connections and dependencies between different resources within the cloud computing environment. As an example, a PaaS self-service activation GUI may provide a subscribing entity with options to configure load balancers, web servers, application instances, databases, and middleware. The subscribing entity may define how many of these cloud resources are to be deployed within a cloud environment and the physical location for different cloud resources or resource groupings. The subscribing entity may drag and drop edges between nodes representing the different resources to define resource dependencies. For instance, a load balancer at a physical location may be logically connected to one or more web servers at the same and/or different locations, which in turn may be connected to one or more application servers. Each application server may further be connected to one or more database servers.

Additionally or alternatively, the subscribing entity may define individual configuration parameters for individual cloud resources. For example, a subscribing entity may configure a load balancer to distribute requests using IP hashing, least connections, least response time, or least bandwidth techniques. As another example, a subscribing entity may configure a database to use columnar storage, row storage, or a hybrid approach. The parameters that are configurable and exposed to the subscribing entity may vary depending on the particular implementation.

Additionally or alternatively, the topology configuration options may allow a user to link third-party cloud services and applications. For example, an SaaS may be compatible with other third party SaaS, DBaaS, and/or PaaS services. The self-service UI may provide a list of compatible cloud services to integrate with a new subscription. The subscribing entity may select one or more cloud services and provide authentication information (e.g., usernames, passwords, digital certificates, etc.) required to access the services.

3.3 Self-Service Configuration of Identity Domain Parameters and Entitlement Allocations In some embodiments, the subscribing entity may configure identity domain parameters and/or entitlement allocations for a cloud service. An identity domain is a mechanism for managing users, roles, identities, authentication, and authorization within a cloud environment. For example, the identity domain may control the authentication and authorization of users permitted to sign in to a cloud service and which features the users may access in relation to the service.

In some embodiments, when a subscribing entity subscribes to a new instance of a cloud service, the subscribing entity may choose an identity domain with which to associate the cloud service. The subscribing entity may create a new identity domain or select a preexisting identity domain, if any are available. In some cases, multiple services may be associated with a single identity domain to share user definitions and authentication. Users within the same identity domain may be granted different levels of access to different cloud services associated with the domain, depending on the configuration parameters defined by the subscribing entity.

In some embodiments, subscribing entities may configure how many users are associated with an identity domain and/or the user attributes within the identity domain. An identity domain for a cloud service may support one or more user types and/or one or more user roles. Example user types include standard users that access the service via standard protocols, such as HTTP, and secure file transfer protocol (SFTP) users that may use SFTP to perform operations on the cloud service. Example user roles may include account administrator, identity domain administrator, service administrator, non-administrative roles, and custom roles. The subscribing entity may import user accounts, assign roles to users, modify user accounts, reset passwords, and/or remove user accounts for each identity domain.

In some embodiments, a subscription to a cloud service may be associated with a set of entitlements, which may vary from order to order. An entitlement may dictate a QoS and/or other parameters of a cloud service to which the subscribing entity is entitled. For example, a subscribing entity may be entitled to a certain number of users and/or active sessions for a given cloud service. The self-service UI may allow a user to assign the entitlements to a particular cloud environment or distribute the entitlements over multiple cloud environments. For instance, if the entitlements on an order allow 300 active sessions with a cloud service, then the subscribing entity may allocate all 300 entitlements to one cloud environment or allocate any portion of the 300 entitlements to one cloud environment and the remaining portion to one or more other cloud environments.

Additionally or alternatively, the self-service UI may allow the subscribing entity to define configuration parameters for different cloud environments. A given cloud service subscription may be associated with one or more production instances and/or one or more test instances, which may be governed by entitlements associated with the cloud service. A production instance or environment may be made accessible to customers or other end users of the subscribing entity. The end users may submit queries and initiate real-world transactions within the production environment. A test instance or environment may be created to allow mock transactions and queries to simulate real-world scenarios.

In some embodiments, the self-service UI allows the subscribing entity to create new production and/or test environments. Additionally or alternatively, the subscribing entity may define configuration parameters for each environment. For example, the subscribing entity may link a production environment with one or more test environments. When linked, a test environment may be configured to perform mock transactions to simulate scenarios in the linked production environment.

The subscribing entity may further distribute entitlements among the various environments. In the preceding example where a cloud service is associated with 300 entitlements, a portion of the 300 entitlements may be assigned to the production environment and the remaining portion may be distributed across one or more test environments linked to the production environment. The environments may then be configured to restrict the number of active sessions or users based on how the entitlements have been distributed by the subscribing entity.

In some embodiments, the self-service UI allows a subscribing entity to manage the configurations of multiple subscriptions and cloud service instances. For example, a subscribing entity may subscribe to a DBaaS and an SaaS from the same cloud service provider. The subscribing entity may specify whether the subscriptions should be merged into a single instance or managed as separate instances, whether the cloud services should execute in the same or separate cloud computing environments, and/or whether the cloud services should share the same identity domain or have different identity domains. An identity domain may manage which third-party websites or applications are permitted to access a user's data stored within a cloud environment via an authorization protocol, such as OAuth.

3.4 Restricting Available Configuration Options

In some embodiments, system 100 restricts the configuration options presented through a self-service UI based in part on attributes associated with a subscribing entity. For example, the available location options for a cloud service instance may be restricted to a subset of datacenter locations managed by the cloud service provider based on the primary location of a subscribing entity. The restriction may be enforced to optimize performance expectations and/or comply with regulations.

Additionally or alternatively, the system may determine available configuration options based on one or more other factors. As an example, the available third-party service options presented through the self-service UI may vary depending on what type of cloud service an entity is subscribing to and/or the tier/QoS of the cloud service. For instance, third-party application integration, database functions, analytic tools, and/or other configuration options may be limited for lower tiers of a cloud service.

In some embodiments, subscription framework 120 maintains a set of rules for restricting configuration options based on parameters associated with incoming cloud service orders. When a subscription request is received, subscription framework 120 may extract user-specific and/or service-specific attributes associated with the order. For example, subscription framework 120 may extract the subscribing entity's number of employees, revenue, location, and/or other information. The subscribing entity may provide this information as part of the ordering process or at a later time, such as during creation of a cloud account.

Subscription framework 120 may then evaluate a set of rules based on the provided attributes and/or service-specific attributes to determine what restriction apply if any, to configuration options for a given cloud service. When rendering the self-service UI, self-service interface engine 126 may prevent selecting of the restricted configuration options, such as by omitting the options or otherwise rendering the interface such that the subscribing entity is not able to select the restricted options.

3.5 Automatically Provisioning Resources Based on Subscriber Input

Upon receiving a provisioning request, provisioning framework 130 generates and executes a set of instructions to provision an instance of the cloud service based on the configuration parameters input through the self-service UI. For example, provisioning framework 130 may generate instructions for commissioning resources from a particular datacenter location, configuring an identity domain in a particular manner, establishing a particular network topology, adding resources to expand an instance of a cloud service, binding external cloud services, and/or decommissioning resources based on the configuration options submitted by the subscribing entity.

In some embodiments, provisioning framework 130 generates the set of instructions by populating a service schematic with configuration parameters input by the subscribing entity through the self-service UI. A service schematic or deployment plan may comprise a blueprint for the cloud service that is compilable by service compiler 132. Example service schematics are described in U.S. application Ser. No. 15/498,184, previously incorporated by reference. A set of service schematic templates may be stored. When a subscribing entity submits a set of configuration parameters, a service schematic template may be selected and populated with the submitted parameters. Provisioning engine 134 may then compile the service schematic to generate and execute the provisioning operations.

In some embodiments, provisioning engine 134 generates a set of configuration files to perform provisioning operations for a new or renewed subscription. A config-file may include instructions for performing CRUD operations. For example, a config-file may create a new tenant in a resource or directory based in part on values submitted with the configuration parameters Additionally or alternatively, a config-file may read/import values to configure a resource, update the set of tenants that have access to a given resource, update configuration settings for the resource, and/or delete tenants that have access to a resource. CRUD operations may be used to configure and update the identity domain for a set of resources. Additionally or alternatively, CRUD operations may be directed to a particular datacenter environment based on the configuration parameters submitted by the subscribing entity.

Figure 3:
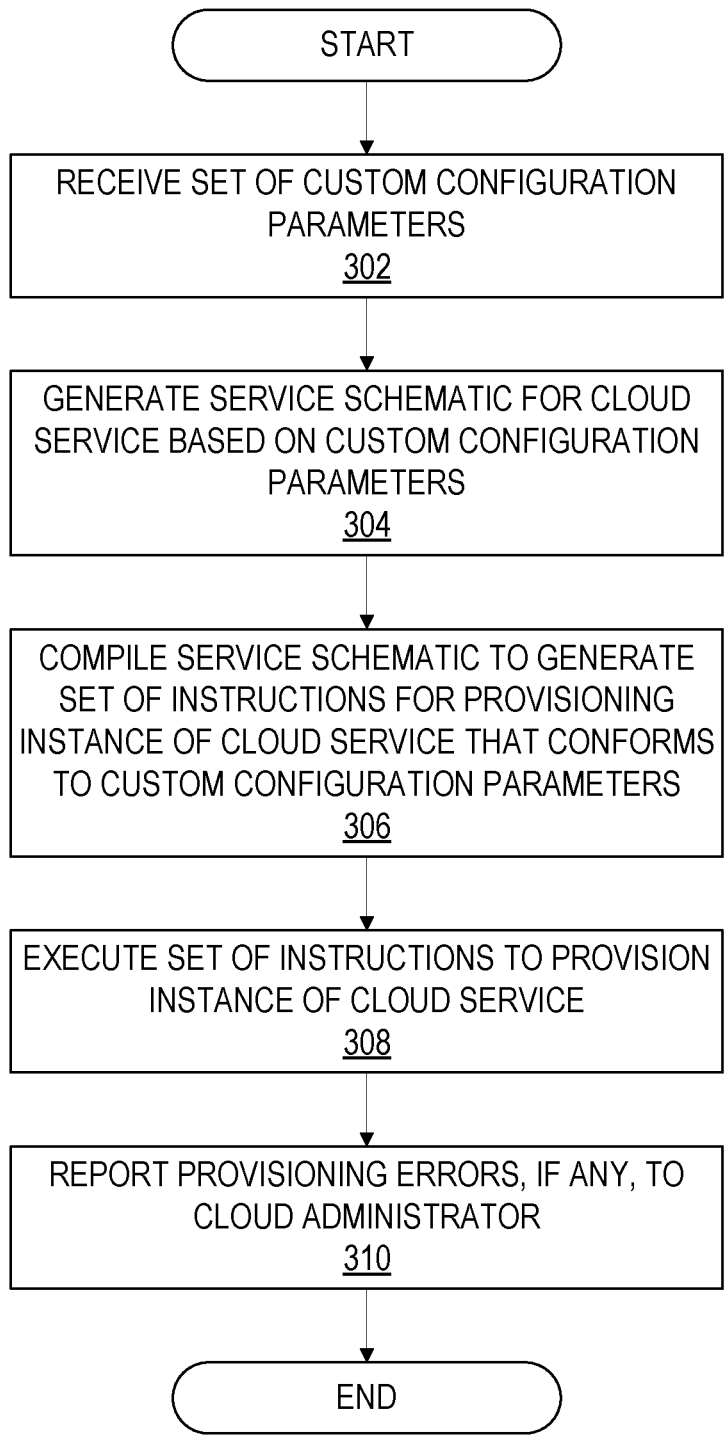
FIG. 3 illustrates an example set of operations for automatically provisioning an instance of a cloud service based on custom parameters in accordance with some embodiments.

FIG. 3 illustrates an example set of operations for automatically provisioning an instance of a cloud service based on custom parameters in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

Referring to FIG. 3, system 100 receives a set of custom configuration parameters through the self-service UI (operation 302). For instance, a user may input topology, deployment, and/or entitlement allocation parameters as previously discussed. Once the configuration parameters have been entered via the self-service UI, the user may click on or otherwise select a UI element, such as a UI button, to submit the custom-defined configuration.

Responsive to receiving the set of custom configuration parameters, provisioning engine 134 generates a service schematic for the cloud service based on the custom configuration parameters (operation 304). For example, the service schematic may define the topology of one or more cloud environments, the physical location of the cloud environments, the number of production and/or test environments, configurations for each environment, configurations of cloud resources, linked third-party applications, and/or entitlement allocations for each cloud environment. The service schematic may combine the custom configuration parameters with one or more other service-specific parameters to generate the service schematic. As previously mentioned, provisioning engine 134 may populate a service schematic template for the cloud service with the custom configuration parameters. In other embodiments, provisioning engine 134 may generate the service schematic without use of a template, such as by executing a set of rules or functions to generate the schematic based on the configuration parameters.

Once generated, the service schematic is compiled by service compiler 132 to generate a set of instructions to provision an instance of the cloud service that conforms to the custom-defined configuration parameters (operation 306). The set of instructions may include one or more configuration files as previously described.

Provisioning framework 130 then executes a set of instructions to perform one or more provisioning operations for the instance of the cloud service (operation 308). For example provisioning framework 130 may allocate cloud resources from one or more physical locations specified in the configuration parameters. Provisioning framework 130 may associate the cloud resources with one or more cloud environments, such as a production environment or test environment, based on the subscribing entity's specifications. Additionally or alternatively, provisioning framework 130 may allocate entitlements, configure cloud resources, link third-party applications, and/or define identity domains based on the custom parameters.

Provisioning framework 130 further report errors, if any, that occurred during provisioning of the custom-configured cloud service (operation 310). In some embodiments, provisioning engine 134 generates a run list during provisioning operations. The run list may track the status of each operation. If an operation fails, it may be retried a threshold amount of times or within a threshold timeframe. If the operation is not able to be automatically completed after a threshold number time or within the threshold timeframe, then provisioning framework 130 may send a notification to the cloud service provider (e.g., an email to an admin account). The cloud service provider may then take corrective action to ensure that the cloud service instance is properly provisioned for the subscribing entity.

4 Adjustable Subscription Periods

In some embodiments, a subscription becomes active once the provisioning framework has successfully completed the provisioning operations for the cloud service instance. In response, self-service framework may initiate a subscription period on behalf of the subscribing entity. Subscription expiration and billing dates may be determined as a function of the start date (e.g., monthly, yearly, etc.).

In some embodiments, subscribing entities are given a window of time for self-service configuration. Once the time limit has lapsed, then one or more responsive actions may be taken. The time window may be selected to provide a flexible timeframe for the subscribing entity to configure the service without unduly burdening the cloud service provider with too many pending/unfulfilled orders. For example, a ten-day or two-week threshold time window may be given. However, the threshold may vary depending on the particular implementation.

Figure 4:
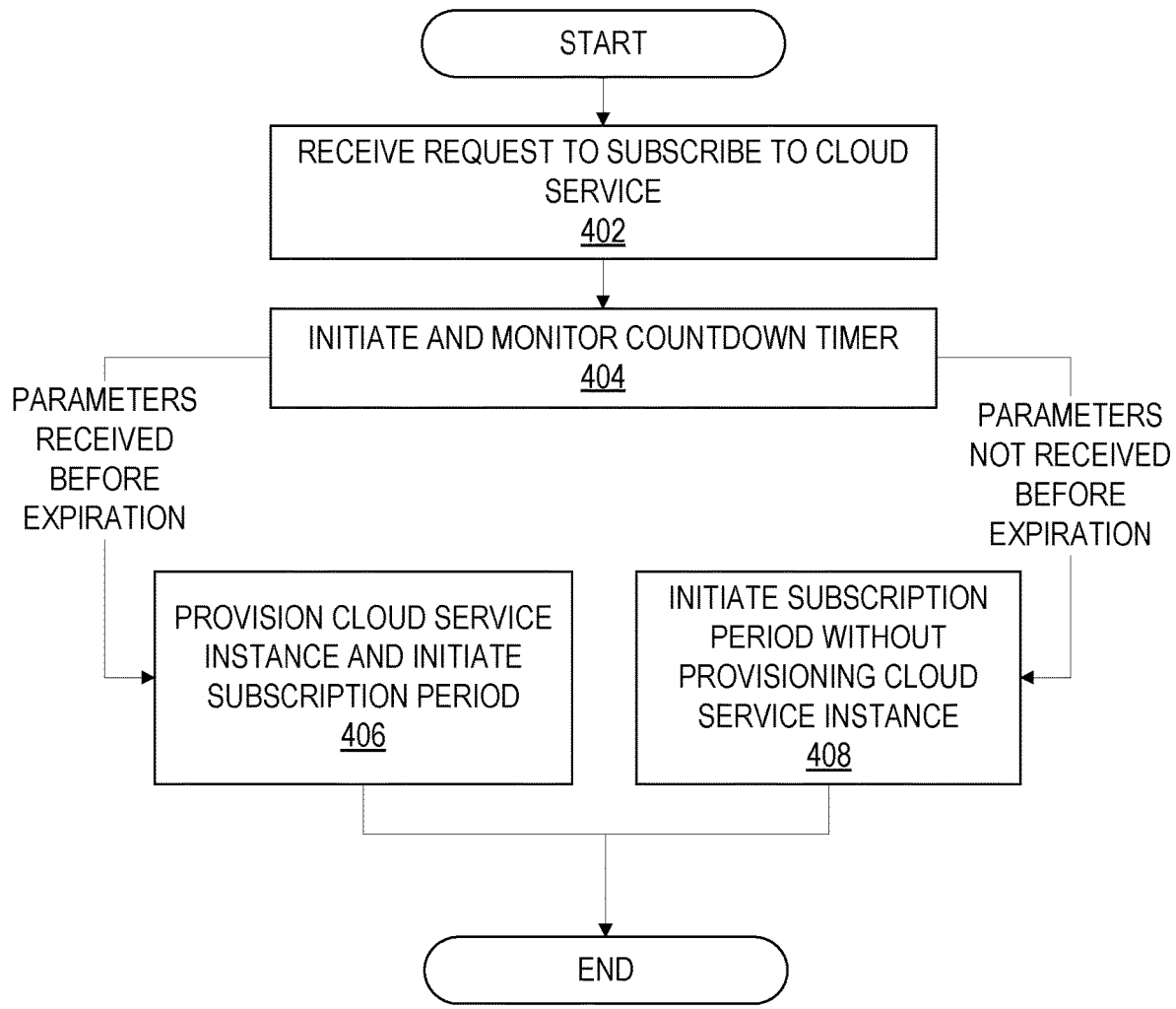
FIG. 4 illustrates an example set of operations for enforcing a time constraint on self-service configuration in accordance with some embodiments.

FIG. 4 illustrates an example set of operations for enforcing a time constraint on self-service configuration in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

The self-service framework receives a subscription request or order from an entity (operation 402).

In response to the request, the self-service framework initiates and monitors a countdown timer for receiving the self-service configuration (operation 404). The countdown timer may be immediately started after an order is placed by a subscribing entity. In other embodiments, the countdown timer may be started at a later time, such as when the cloud account is activated or linked to the order.

If the self-service configuration parameters are received before the countdown timer expires, then a cloud service instance is provisioned, and the subscription period is initiated (operation 406).

If the self-service configuration parameters are not received before the countdown timer expires, then the subscription period is initiated without provisioning an instance of the cloud service instance (operation 408). In this case, the subscribing entity may input the configuration parameters and the cloud service instance may be provisioned after the subscription period has started. The self-service provisioning framework may send a notification to the subscribing entity to indicate that the subscription period has started and to remind the entity to provision the instance of the cloud service.

In other embodiments, different responsive actions may be triggered at operation 408 once the countdown timer has lapsed. For example, the cloud service subscription may be automatically canceled if the subscribing entity has not activated/provisioned the instance of the cloud service within the threshold timeframe. As another example, a cloud service instance may be automatically provisioned using a default set of configuration parameters. In yet another example, the subscribing entity may be sent one or more reminder emails and the countdown timer reset before any of the above responsive actions are taken.

5. Example Self-Service Configuration Interfaces

FIGS. 5A-5K illustrate an example set of user interfaces through which subscribing entities may perform self-service activation and provisioning operations in accordance with some embodiments. The interfaces and operations described below should be understood as a specific example which may not be applicable to certain embodiments. Accordingly, the example interface and operations described below should not be construed as limiting the scope of any of the claims.

Figure 5A:
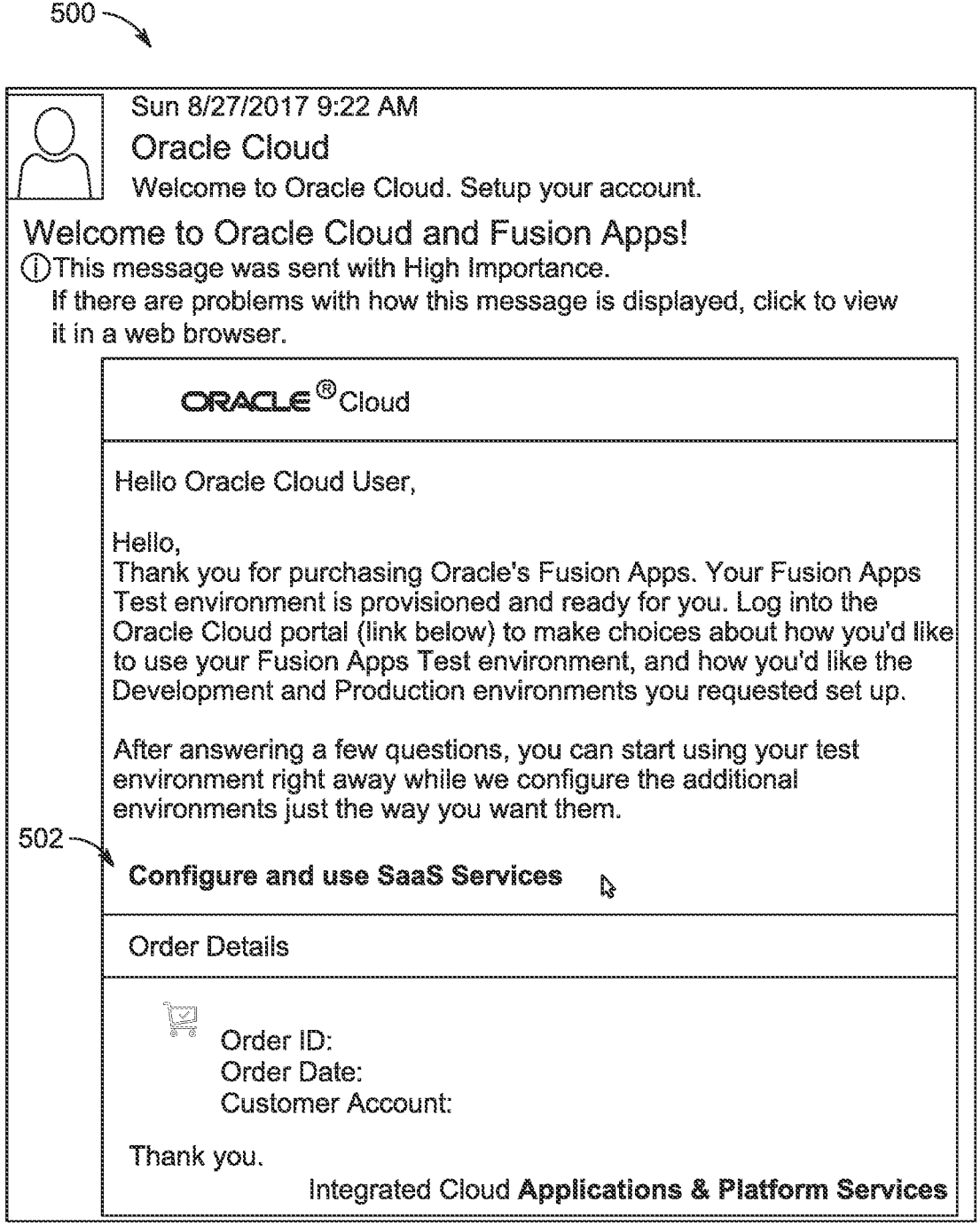

FIG. 5A illustrates example activation email 500 sent to a subscribing entity in accordance with some embodiments. Activation email 500 includes a confirmation of the cloud service order and embedded link 502. Upon selecting link 502, the recipient may be redirected (e.g., within a client web browser or mobile app) to a cloud portal through which the self-service configuration options may be accessed.

Figure 5B:
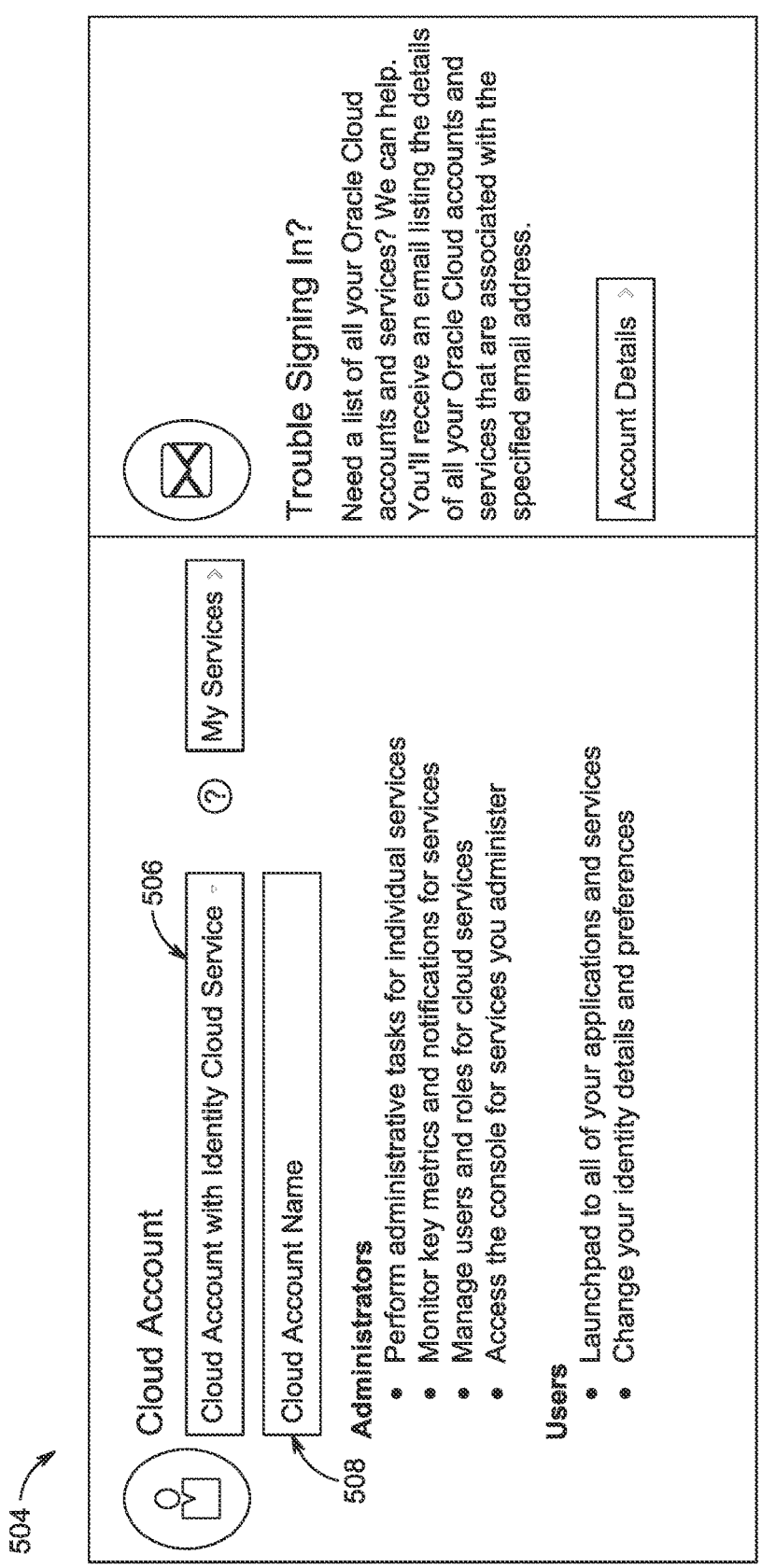

FIG. 5B illustrates example cloud portal interface 504 in accordance with some embodiments. The subscribing entity may select a cloud account from drop-down menu 506 and input the cloud account name in input box 508. Once the cloud account has been identified, the user may be prompted to provide authentication credentials. If the user does not already have an account, then the user may be prompted to create a new account.

Figure 5C:
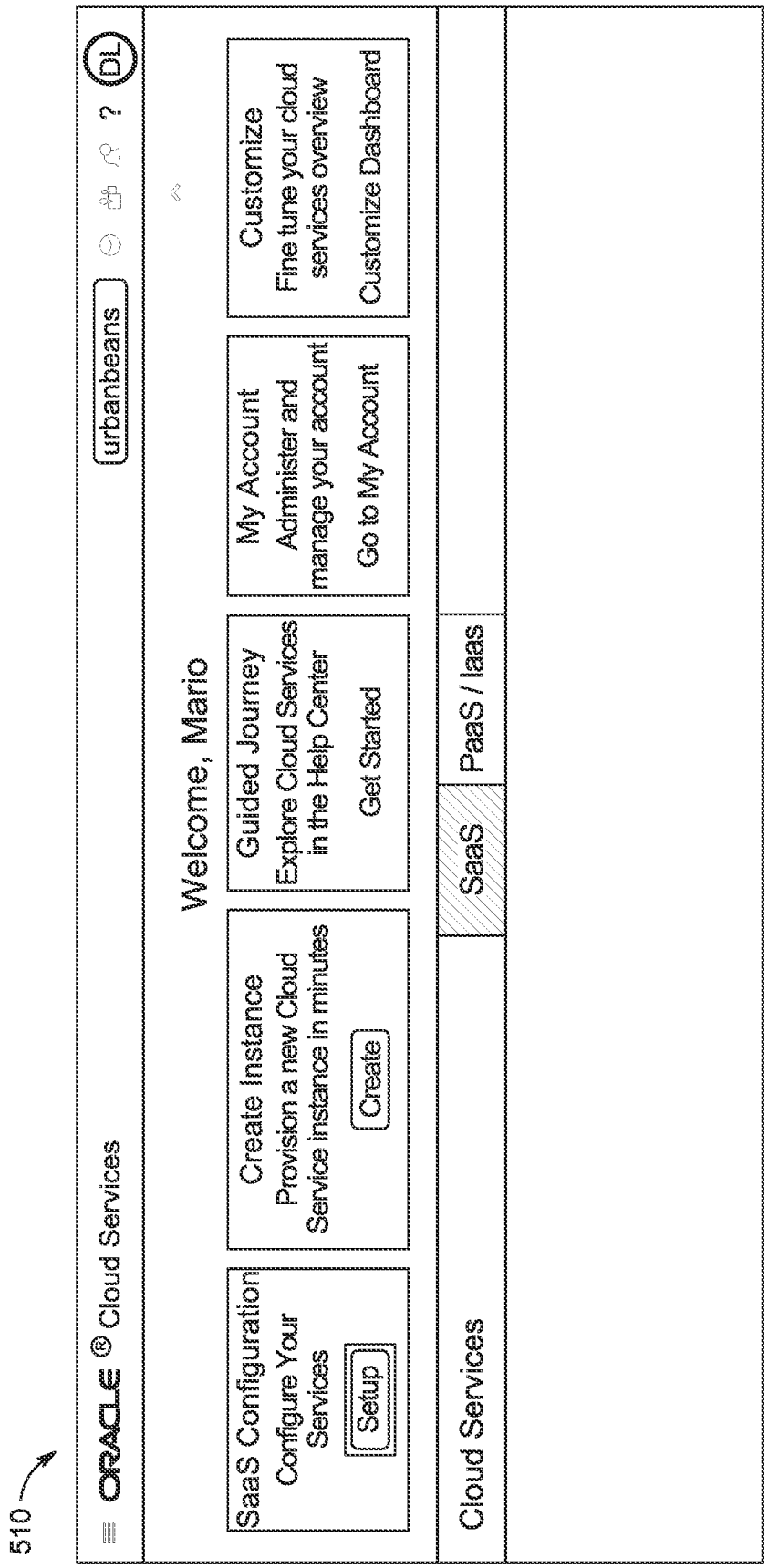

FIG. 5C illustrates example self-service portal interface 510 in accordance with some embodiments. The interface allows a user to setup configuration parameters, create cloud service instances, receive guidance, view account information, and customize the cloud account dashboard. The subscriber may toggle between SaaS and PaaS/IaaS configuration settings, depending on the cloud services linked to the cloud account.

Figure 5D:
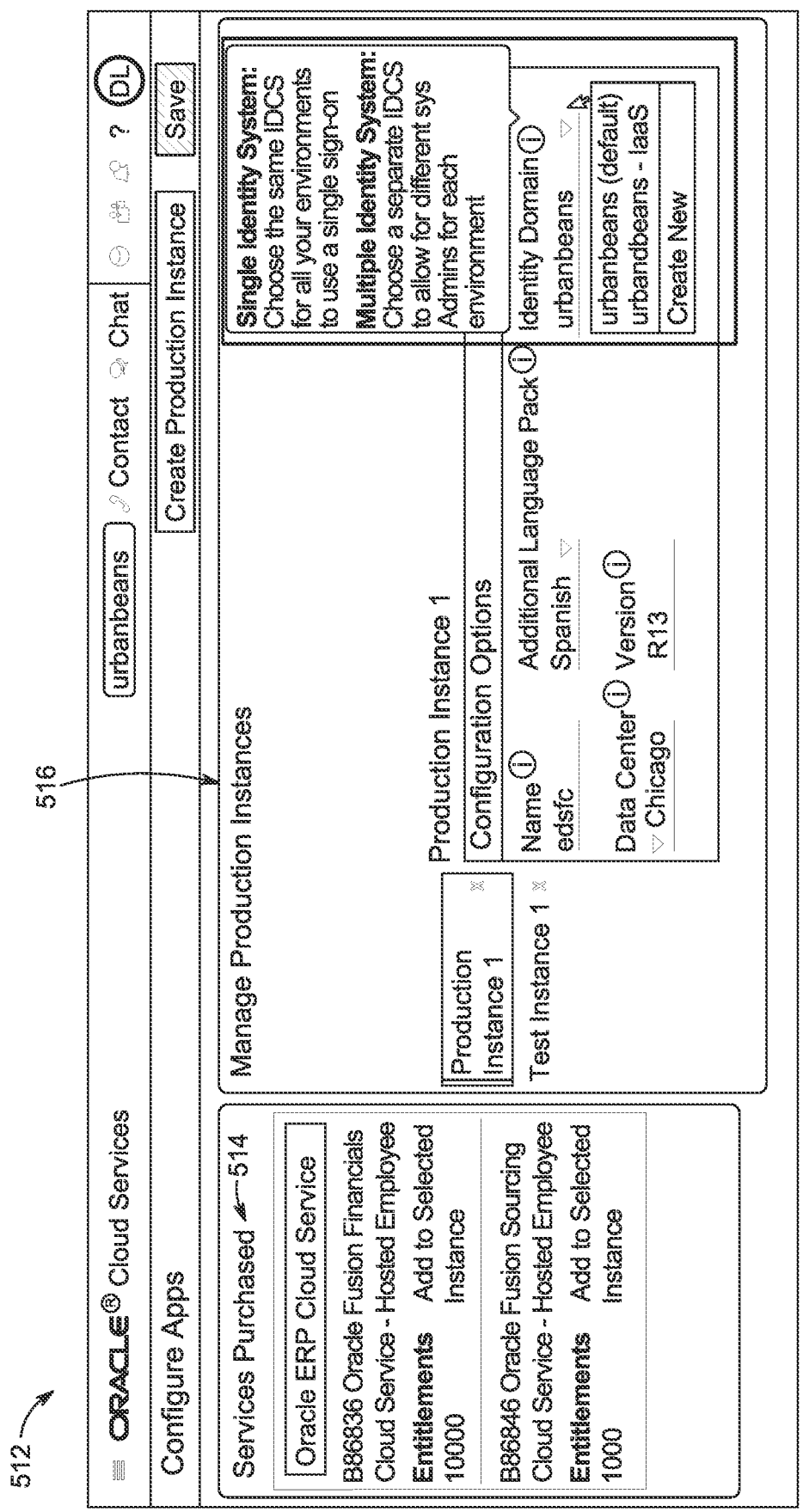

FIG. 5D illustrates example self-service configuration interface 512 in accordance with some embodiments. The cloud services purchased by the subscribing entity are depicted in interface pane 514. Interface pane 516 allows a user to manage production instances of the cloud service. In the present example, the subscriber has purchased two different cloud services: one with 10,000 entitlements and another with 1,000 entitlements. The subscriber has further created a production instance and a test instance. The configuration options for the selected production instance include the name, data center location, language, version, and identify domain. The entitlements may be allocated to a single instance or distributed across multiple instances per the subscriber's input.

Further, the identity domain configuration option allows a subscriber to use a single identify domain for all cloud environments or different identity domains for the different cloud environments. A single identity domain allows for all environments to be accessed via a single sign-on and set of authentication credentials. Multiple identity domains may be set up to allow for different administrator accounts/credentials for different environments. When multiple identity domains are established, a user of one cloud environment may be prevented from accessing another environment in a different domain, even though both environments are linked to the same cloud account.

Figure 5E:
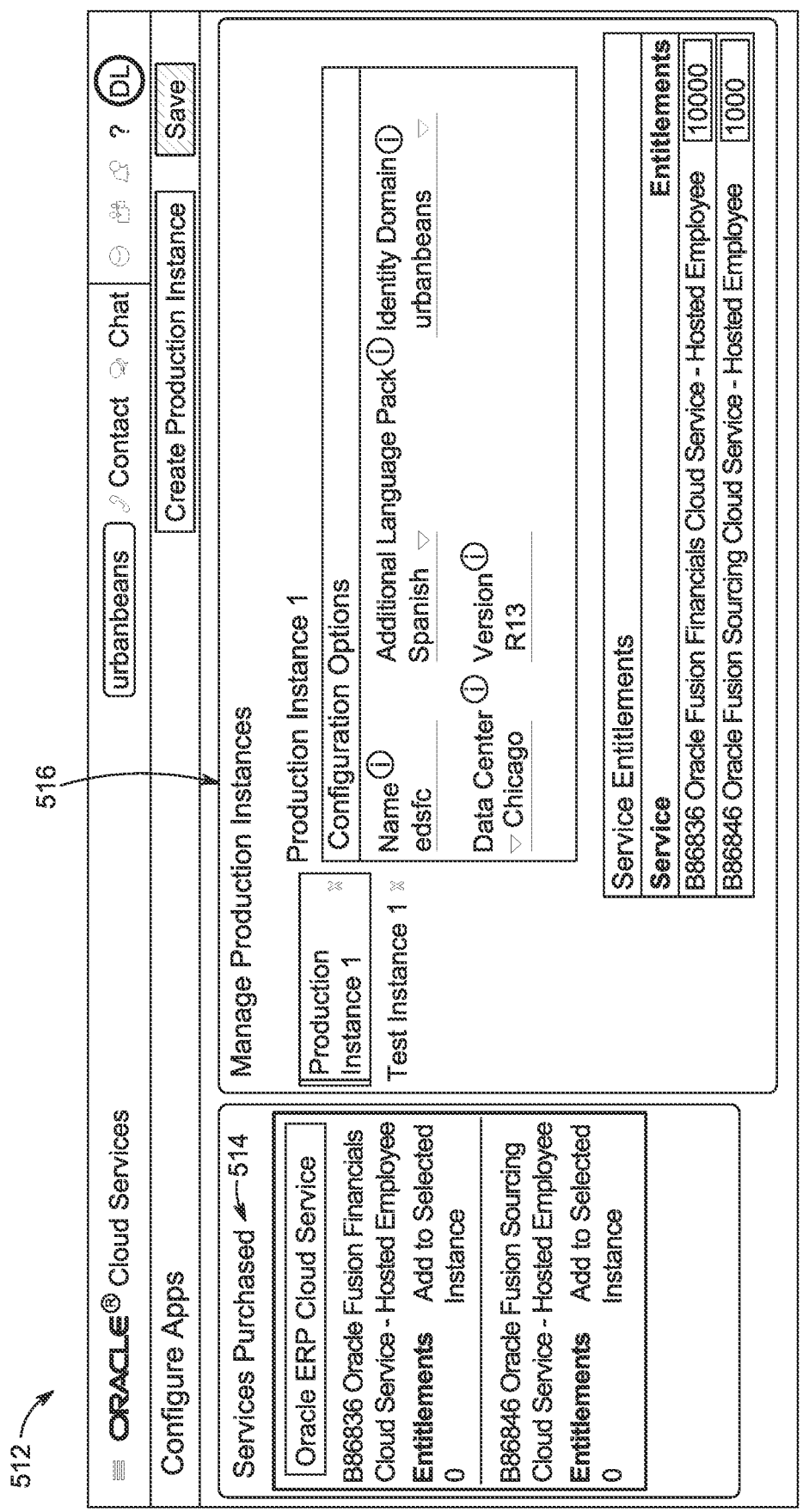

FIG. 5E illustrates example self-service configuration interface 512 depicting how a subscriber has allocated entitlements in accordance with some embodiments. In the present example, all entitlements have been assigned to the production instance. The user may save the current configuration settings.

Figure 5F:
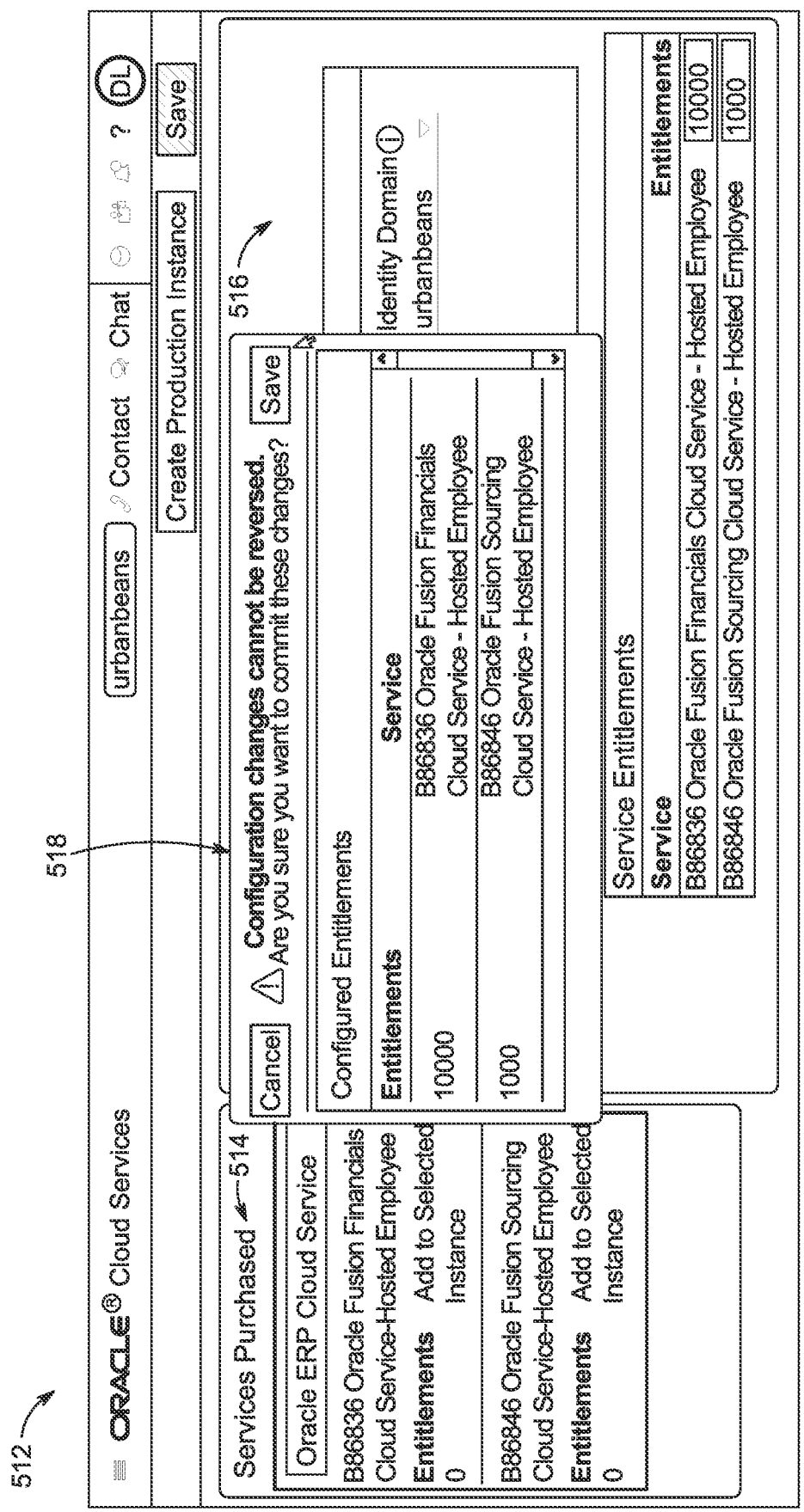

In some embodiments, once saved, the configurations may not be reversed. FIG. 5F illustrates example interface 518 comprising a warning message to confirm that the user would like to commit the current configuration options.

Figure 5G:
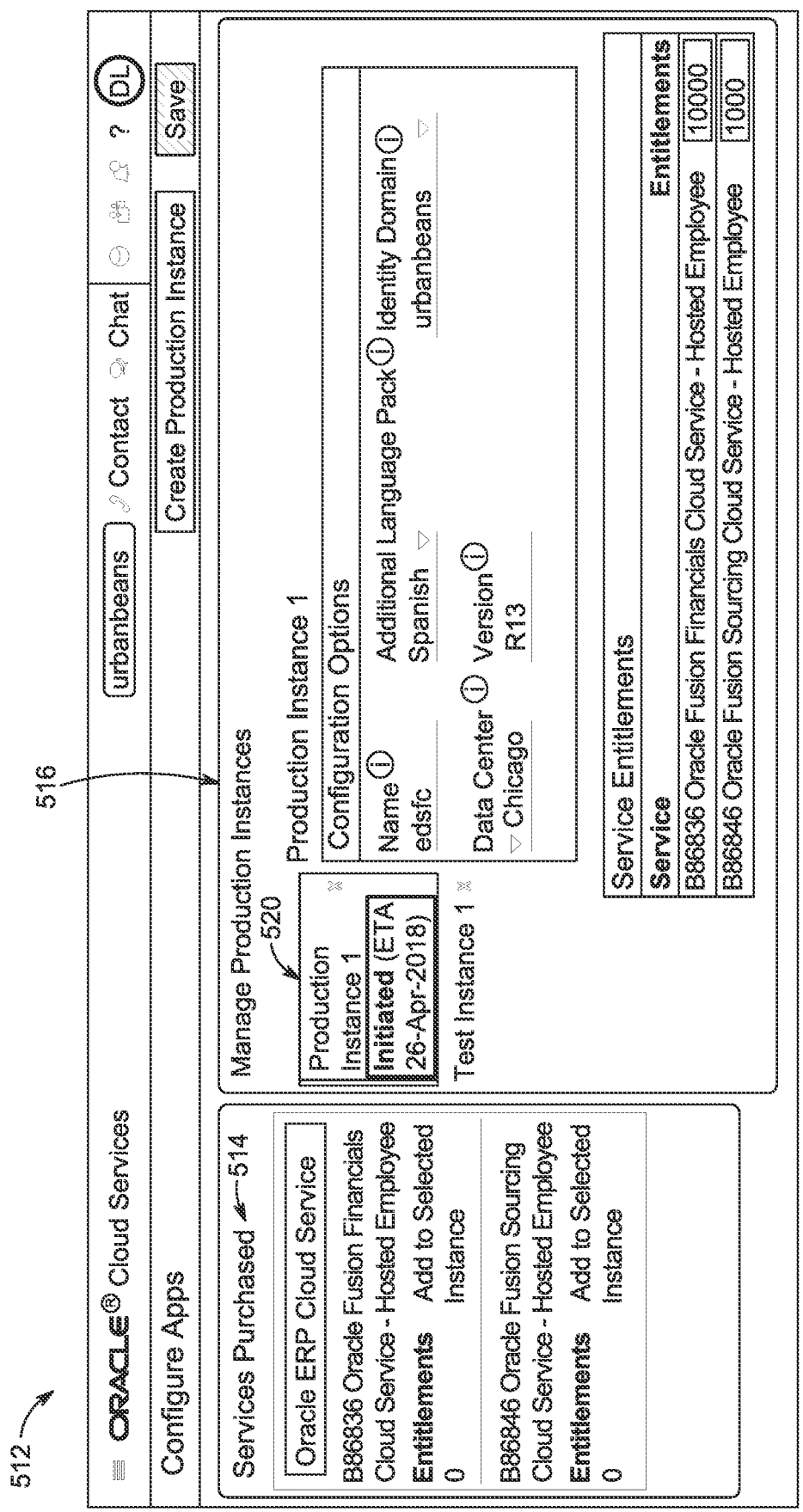

Once committed, one or more provisioning operations may be initiated. In FIG. 5G example interface 512, presents, via interface element 520, the provisioning status and estimated completion time for the production instance based on the submitted configuration options. Thus, the subscribing entity is kept apprised of when the cloud service instance becomes fully operational.

FIG. 5H illustrates example self-service interface 522, whereby a subscribing entity is presented with configuration options for a test instance in accordance with some embodiments. The new test instance may be associated with two different production instances in the present example.

Once the subscriber has selected a production instance, then the subscriber may specify additional configuration options for the test instance. For example, FIG. 5I illustrates an example set of configuration options 524 for the test instance. The configuration options mirror those described above with respect to the associated production instance.

In some embodiments, a subscribing entity may decommission or otherwise remove cloud service instances from a pool of existing environments. This scenario may occur, for example, where a subscriber has renewed a subset of existing environments from a pool. In this case, a customer may be given a specific timeframe to decommission a set of instances. Failing to do so within the timeframe may trigger an automatic decommission process as defined by a rule/policy.

Figure 5J:
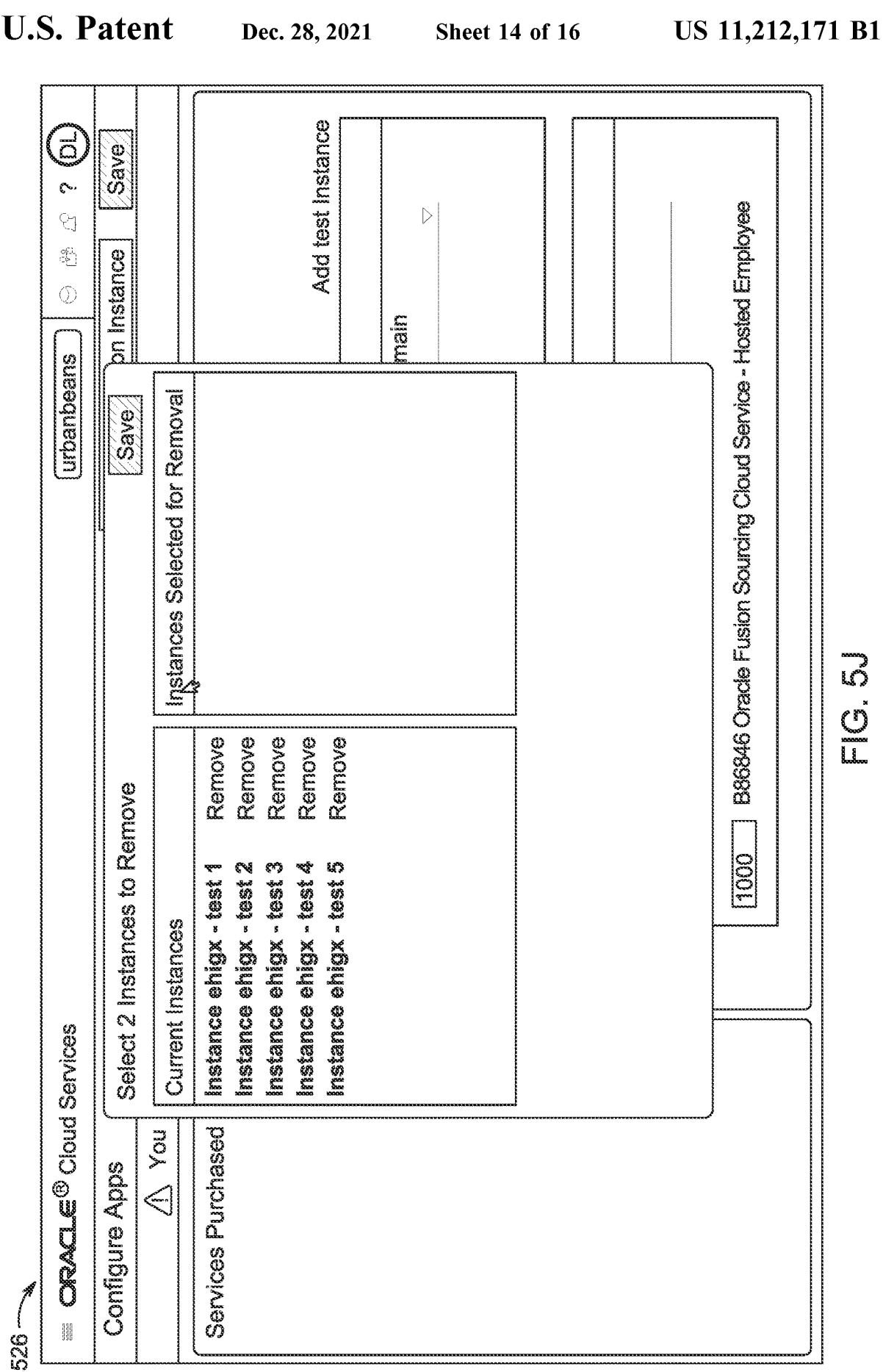

FIG. 5J illustrates example interface 526 for selecting a cloud service instance to decommission. In the present example, the subscriber has renewed only three of the five instances. The user is thus required to select two instances to remove.

Additionally or alternatively, a subscribing entity may upgrade an existing service. FIG. 5K illustrates example interface 528 for upgrading a cloud service instance. In this example, the provisioning operations involve deleting an existing cloud service environment and migrating the services in the environment to an upgraded version.

6. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
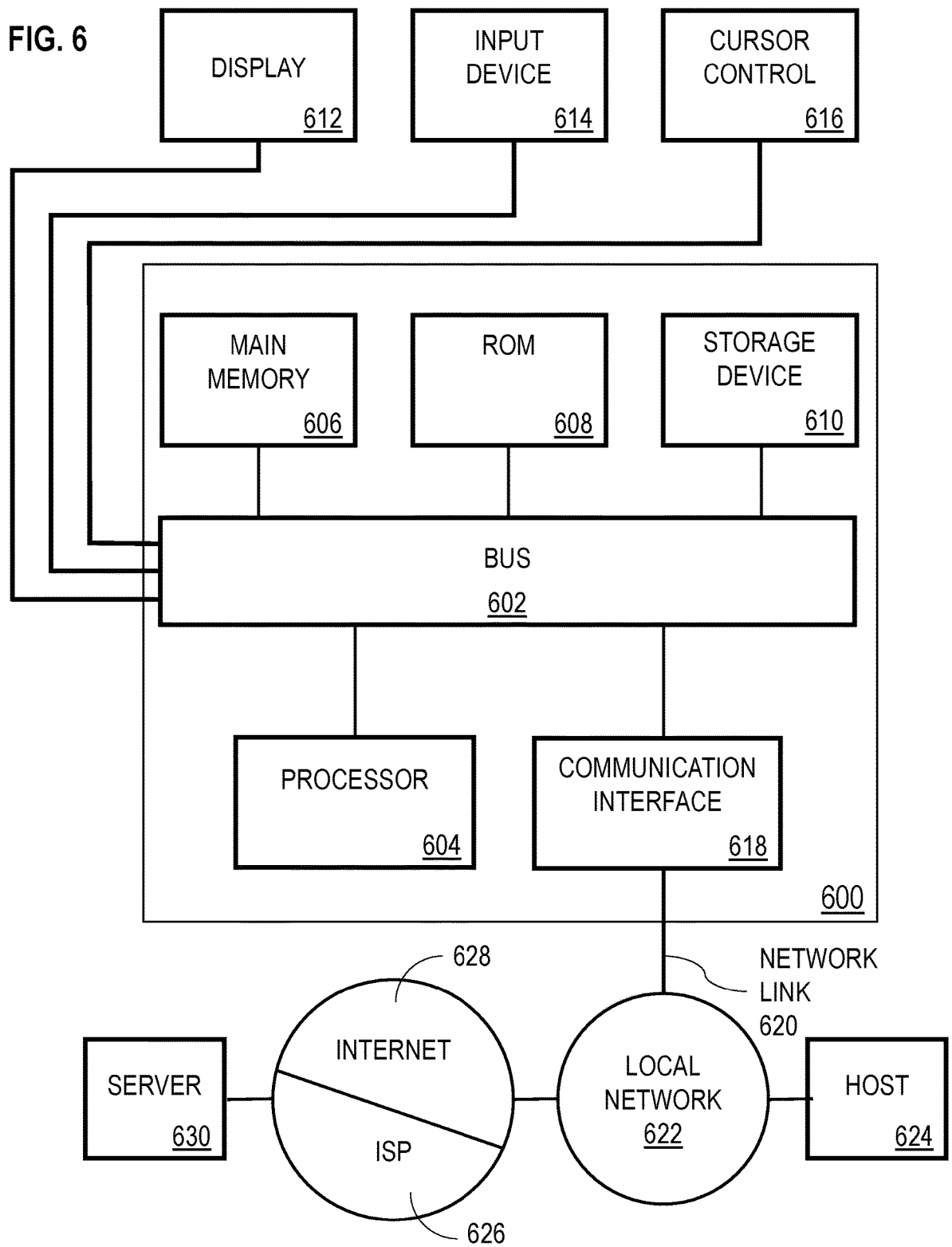
FIG. 6 shows a block diagram that illustrates a computer system in accordance with one or more embodiments.

For example, FIG. 6 is a block diagram that illustrates computer system 600 upon which an embodiment of the invention may be implemented. Computer system 600 includes bus 602 or other communication mechanism for communicating information, and a hardware processor 604 coupled with bus 602 for processing information. Hardware processor 604 may be, for example, a general purpose microprocessor.

Computer system 600 also includes main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT) or light emitting diode (LED) monitor, for displaying information to a computer user. Input device 614, which may include alphanumeric and other keys, is coupled to bus 602 for communicating information and command selections to processor 604. Another type of user input device is cursor control 616, such as a mouse, a trackball, touchscreen, or cursor direction keys for communicating direction information and command selections to processor 604 and for controlling cursor movement on display 612. Input device 614 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 600 can receive the data on the network line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause operations comprising:
   receiving a request to subscribe an entity to a cloud service;
   responsive to receiving the request to subscribe the entity to the cloud service, generating an interface that is associated with a threshold timeframe and provides control, to the entity subscribing to the cloud service, over a set of configuration parameters for provisioning an instance of the cloud service, wherein the interface is accessible through an account associated with the entity;
   receiving, through the generated interface, at least one configuration parameter for the instance of the cloud service;
   responsive to receiving the at least one configuration parameter for the instance of the cloud service, automatically generating a set of instructions for provisioning the instance of the cloud service for the entity; and
   executing the set of instructions for provisioning the instance of the cloud service for the entity.

2. The one or more non-transitory computer-readable media of claim 1, wherein the instructions further cause operations comprising: generating a link and credentials for accessing the interface; and sending the link and credentials to the entity.

3. The one or more non-transitory computer-readable media of claim 2, wherein the link and credentials are sent to an email address associated with the account associated with the entity.

4. The one or more non-transitory computer-readable media of claim 1, wherein the at least one configuration parameter identifies a topology associated with the instance of the cloud service; wherein the set of instructions for provisioning the instance of the cloud service for the entity are generated based on the identified topology.

5. The one or more non-transitory computer-readable media of claim 4, wherein the topology identifies a location of computing resources used to run the instance of the cloud service.

6. The one or more non-transitory computer-readable media of claim 4, wherein the topology specifies an identify domain for the instance of the cloud service, wherein the at least one configuration parameter indicates whether the identity domain is to be shared or independent of another identity domain for a second cloud service subscribed to by the entity.

7. The one or more non-transitory computer-readable media of claim 4, wherein the topology specifies dependencies between two or more cloud resources provided by the cloud service.

8. The one or more non-transitory computer-readable media of claim 1, wherein the at least one configuration parameter indicates the instance of the cloud service is for expanding another cloud service subscribed to by the entity; wherein the set of instructions include instructions for provisioning computing resources to expand the other cloud service.

9. The one or more non-transitory computer-readable media of claim 1, wherein the at least one configuration parameter distributes entitlements between different cloud environments including at least one production environment and at least one test environment.

10. The one or more non-transitory computer-readable media of claim 1, wherein available options for the configuration parameters are restricted, based at least in part, on one or more attributes associated with the entity.

11. The one or more non-transitory computer-readable media of claim 10, wherein the one or more attributes associated with the entity identify an entity location; wherein available location options from which computing resources are provisioned for the instance of the cloud service are restricted based on the entity location.

12. The one or more non-transitory computer-readable media of claim 1, wherein the instructions further cause operations comprising: determining whether the configuration parameters were received through the generated interface within the threshold timeframe; responsive to determining that the configuration parameters were not received through the generated interface within the threshold timeframe, changing a subscription period for the instance of the cloud service.

13. The one or more non-transitory computer-readable media of claim 1, wherein the instructions further cause operations comprising: determining whether the configuration parameters were received through the generated interface within the threshold timeframe; responsive to determining that the configuration parameters were not received through the generated interface within the threshold timeframe, automatically initiating a subscription period for the instance of the cloud service.

14. The one or more non-transitory computer-readable media of claim 1, wherein automatically generating the set of instructions for provisioning the instance of the cloud service for the entity comprises populating a service schematic with the at least one configuration parameter; and after populating the service schematic, compiling the service schematic.

15. The one or more non-transitory computer-readable media of claim 1, wherein compiling the service schematic generates a set of one or more configuration files including a set of CRUD instructions.

16. The one or more non-transitory computer-readable media of claim 1, wherein the instructions further cause operations comprising: detecting an error when executing the set of instructions for provisioning the instance of the cloud service; responsive to detecting the error, sending a notification to a cloud administrator.

17. The one or more non-transitory computer-readable media of claim 1, wherein the instructions further cause operations comprising: generating a run list that tracks a status of executing each instruction in the set of instructions.

18. The one or more non-transitory computer-readable media of claim 1, wherein the instructions further cause operations comprising: responsive to receiving the request to subscribe an entity to a cloud service, sending a link to the entity to activate the account associated with the entity; wherein the interface is generated responsive to activating the account; wherein the at least one configuration parameter defines one or more resource dependencies and distributes entitlements between different cloud computing environments; wherein the set of instructions customize the instance of the cloud service for the entity based on the at least one configuration parameter that defines the one or more resource dependencies and distributes the entitlements between different cloud computing environments.

19. A system comprising:
one or more hardware processors and
one or more non-transitory computer-readable media storing instructions which, when executed by the one or more hardware processors, cause the system to perform operations comprising:
receiving a request to subscribe an entity to a cloud service;
responsive to receiving the request to subscribe the entity to the cloud service, generating an interface that is associated with a threshold timeframe and provides control, to the entity subscribing to the cloud service, over a set of configuration parameters for provisioning an instance of the cloud service, wherein the interface is accessible through an account associated with the entity;
receiving, through the generated interface, at least one configuration parameter for the instance of the cloud service;
responsive to receiving the at least one configuration parameter for the instance of the cloud service, automatically generating a set of instructions for provisioning the instance of the cloud service for the entity; and
executing the set of instructions for provisioning the instance of the cloud service for the entity.

20. A method comprising:
receiving a request to subscribe an entity to a cloud service;
responsive to receiving the request to subscribe the entity to the cloud service, generating an interface that is associated with a threshold timeframe and provides control, to the entity subscribing to the cloud service, over a set of configuration parameters for provisioning an instance of the cloud service, wherein the interface is accessible through an account associated with the entity;
receiving, through the generated interface, at least one configuration parameter for the instance of the cloud service;
responsive to receiving the at least one configuration parameter for the instance of the cloud service, automatically generating a set of instructions for provisioning the instance of the cloud service for the entity; and executing the set of instructions for provisioning the instance of the cloud service for the entity.

\* \* \* \* \*

UNITED STATES PATENT AND TRADEMARK OFFICE
CERTIFICATE OF CORRECTION

PATENT NO. : 11,212,171 B1
APPLICATION NO. : 17/147307
DATED : December 28, 2021
INVENTOR(S) : Ozkan et al.

It is certified that error appears in the above-identified patent and that said Letters Patent is hereby corrected as shown below:

On the Title Page

Item (72) Inventors, Line 6, delete "FosterCity" and insert -- Foster City --, therefor.

Item (72) Inventors, Line 7, delete "Fister City" and insert -- Foster City --, therefor.

In the Drawings

On sheet 8 of 16, in FIG. 5D, Line 16, delete "urbandbeans" and insert -- urbanbeans --, therefor.

In the Specification

In Column 2, Line 41, delete "PARAMATERS" and insert -- PARAMETERS --, therefor.

In Column 13, Line 10, delete "parameters" and insert -- parameters. --, therefor.

Signed and Sealed this
Twenty-fourth Day of May, 2022

Katherine Kelly Vidal
*Director of the United States Patent and Trademark Office*